United States Patent
Bohn et al.

(10) Patent No.: US 11,125,019 B2
(45) Date of Patent: Sep. 21, 2021

(54) DRILL BIT FOR CHISELLING ROCK

(71) Applicant: Hilti Aktiengesellschaft, Schaan (LI)

(72) Inventors: Klaus-Peter Bohn, Schaan (LI); Roland Foser, Ruggell (LI); Markus Hartmann, Mauerstetten (DE); Bastian Pluemacher, Schwabmuenchen (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 16/626,213

(22) PCT Filed: Jun. 20, 2018

(86) PCT No.: PCT/EP2018/066356
§ 371 (c)(1),
(2) Date: Dec. 23, 2019

(87) PCT Pub. No.: WO2019/002037
PCT Pub. Date: Jan. 3, 2019

(65) Prior Publication Data
US 2020/0123857 A1    Apr. 23, 2020

(30) Foreign Application Priority Data

Jun. 27, 2017 (EP) .................................. 17178103

(51) Int. Cl.
*E21B 10/36* (2006.01)
*E21B 10/58* (2006.01)
*E21B 11/00* (2006.01)

(52) U.S. Cl.
CPC .............. *E21B 10/36* (2013.01); *E21B 10/58* (2013.01); *E21B 11/005* (2013.01)

(58) Field of Classification Search
CPC .......... E21B 10/36; E21B 10/38; E21B 10/58; E21B 11/005
See application file for complete search history.

(56) References Cited

U.S. PATENT DOCUMENTS

| 5,234,294 A | 8/1993 | Hoppe et al. |
| 5,992,546 A | 11/1999 | Heinrich et al. |
| 6,065,908 A | 5/2000 | Kleine et al. |
| 6,189,633 B1 | 2/2001 | Kleine et al. |

(Continued)

FOREIGN PATENT DOCUMENTS

| CN | 1071114 A | 4/1993 |
| CN | 1232740 A | 10/1999 |

(Continued)

OTHER PUBLICATIONS

PCT/EP2018/066356, International Search Report dated Aug. 23, 2018 (Two (2) pages).

(Continued)

*Primary Examiner* — Dany E Akakpo
(74) *Attorney, Agent, or Firm* — Crowell & Moring LLP

(57) ABSTRACT

A drill bit for chiselling rock includes an impact face at an insertion end of the drill bit, a hollow shank, where a delivery passage is defined within the hollow shank, and a drill head, where the drill head has, at a front end of the drill head, a plurality of cutting faces, an intake opening, and an intake passage. The intake passage connects the intake opening to the delivery passage. The intake opening has a noncircular cross section.

6 Claims, 4 Drawing Sheets

(56) References Cited

U.S. PATENT DOCUMENTS

| | | |
|---|---|---|
| 6,533,047 B2 | 3/2003 | Kleine et al. |
| 6,692,690 B2 | 2/2004 | Akerman et al. |
| 8,430,608 B2 | 4/2013 | Sugano et al. |
| 8,841,005 B2 | 9/2014 | Mirchandani et al. |
| 9,364,927 B2 | 6/2016 | Bohn et al. |
| 10,051,138 B1 | 8/2018 | Liao |
| 2007/0193784 A1 | 8/2007 | Heemann et al. |
| 2010/0155149 A1* | 6/2010 | Keshavan ............... E21B 10/43 175/428 |
| 2011/0274885 A1 | 11/2011 | Jonker et al. |
| 2018/0015639 A1* | 1/2018 | Miyanaga .......... B23Q 11/0046 |

FOREIGN PATENT DOCUMENTS

| | | |
|---|---|---|
| CN | 1232741 A | 10/1999 |
| CN | 1302711 A | 7/2001 |
| CN | 101528394 A | 9/2009 |
| CN | 101959634 A | 1/2011 |
| CN | 102773926 A | 11/2012 |
| CN | 104763346 A | 7/2015 |
| CN | 105378211 A | 3/2016 |
| CN | 205416045 U | 8/2016 |
| CN | 106794597 A | 5/2017 |
| DE | 20 2009 013 073 U1 | 1/2010 |
| EP | 0 048 908 A1 | 4/1982 |
| EP | 0 941 793 A2 | 9/1999 |
| JP | 10-121182 A | 5/1998 |
| JP | 11-291236 A | 10/1999 |
| JP | 2005-186421 A | 7/2005 |
| JP | 2012-515846 A | 7/2012 |
| JP | 2014-37767 A | 2/2014 |
| WO | WO 2016/129268 A1 | 8/2016 |

OTHER PUBLICATIONS

U.S. Patent Application, "Drill for Chiselling Rock", filed Dec. 23, 2019, Inventor Klaus-Peter Bohn et al.

U.S. Patent Application, "Drill for Chiseling Stone", filed Dec. 23, 2019, Inventor Klaus-Peter Bohn et al.

* cited by examiner

DRILL BIT FOR CHISELLING ROCK

FIELD OF THE INVENTION

The present invention relates to a drill bit for the chiselling of rock. In particular, the invention relates to a drill bit in the case of which drill cuttings can be transported away via a hollow shank. The drill bit does not have or require a helical shank.

DISCLOSURE OF THE INVENTION

The drill bit for the chiselling of rock has an impact face at an insertion end, a hollow shank, within which a delivery passage is provided, and a drill head. The drill head has, at a front end, three or more cutting faces and one or more intake openings. Arranged within the drill head are intake passages that connect the intake openings to the delivery passage. The intake openings have a noncircular cross section. The noncircular intake openings, while having an identical cross-sectional area, can be positioned closer to the tip than circular intake openings. The closer positioning to the tip improves the extraction performance since a majority of the drill cuttings arises directly at the tip.

In a preferred configuration, the intake openings have a triangular shape. These allow particularly close positioning to the tip in the case of a large cross-sectional area.

In one configuration, a surface area of the intake opening is at least 30% greater than the surface area of the largest circle that is inscribable in the intake opening.

In one configuration, the intake openings take up more than 10% of the front end of the drill head. Preferably, the intake openings take up less than 25% of the front end of the drill head, since otherwise the drilling performance deteriorates significantly.

In one configuration, a first portion of the intake passage adjoining the intake opening has a first inclination with respect to the drill bit axis and a second portion of the intake passage adjoining the hollow shank has a second inclination with respect to the drill bit axis. The second inclination is greater than the first inclination.

The cutting faces of the drill head are preferably made of sintered tungsten carbide. The hard material is suitable particularly for the chiselling of rock. The cutting faces can have a rake face and a flank face, which both form a part of the impact face and are in contact with one another along a chisel edge. The geometry is particularly suitable for the chiselling of rock.

BRIEF DESCRIPTION OF THE FIGURES

The following description explains the invention on the basis of exemplary embodiments and figures, in which.

EMBODIMENTS OF THE INVENTION

Figure 1:
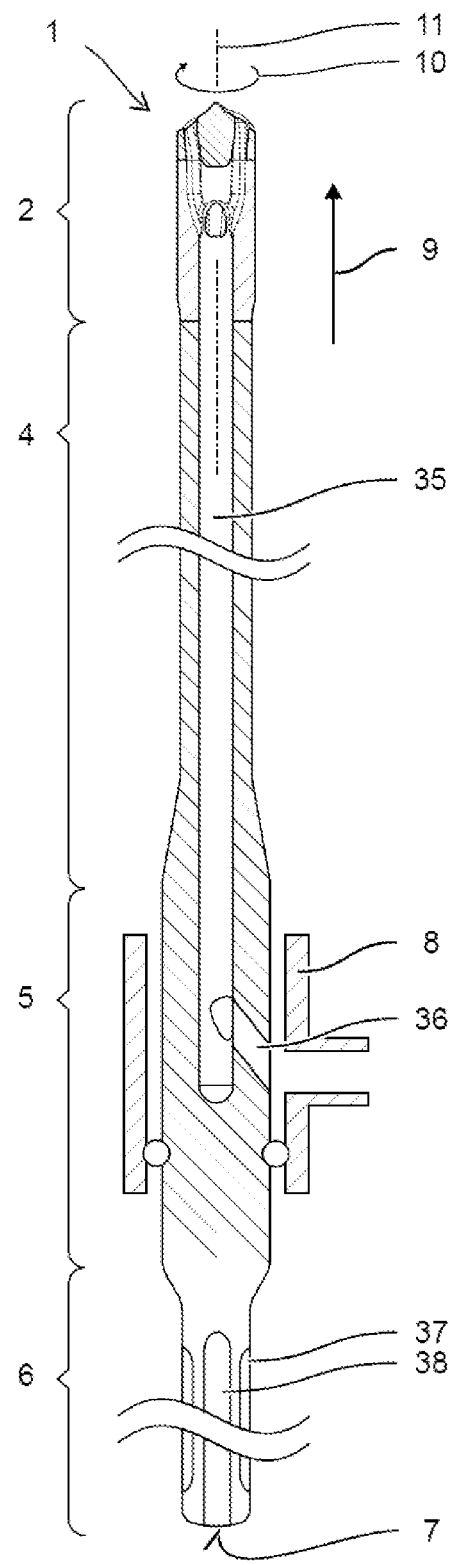
FIG. 1 shows a drill bit

FIG. 1 shows an exemplary drill bit 1. The drill bit 1 has a drill head 2 with intake openings 3, a hollow shank 4 with an extraction port 5, and an insertion end 6 with an impact face 7. A sleeve 8 can enclose the extraction port 5.

The drill bit 1 is designed to break down mineral construction materials, for example concrete, brick. The insertion end 6 can be inserted into a portable power tool, for example a drilling machine or a hammer drill. An impact mechanism of the portable power tool periodically strikes the impact face 7 at the insertion end 6. The shock wave of the impact passes through the hollow shank 4 in the impact direction 9 as far as the drill head 2. The drill head 2 breaks up the mineral material. The drill bit 1 is preferably rotated in a direction of rotation 10 about its drill bit axis 11 between impacts. Consequently, the drill bit 1 strikes the material in different orientations. The resulting drill cuttings can be removed from the drilled hole directly from the front end 12 of the drill bit 1. A vacuum cleaner is attached to the sleeve 8. The air stream draws in the drill cuttings at the intake openings 3 directly at the front end 12 of the drill bit 1. The drill cuttings are transported away within the hollow shank 4.

Figure 6:
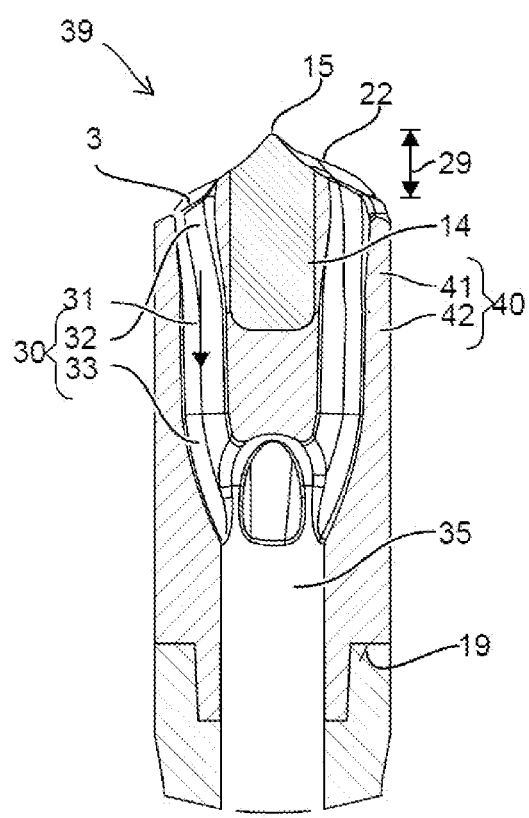
FIG. 6 shows a section through the drill head

The exemplary drill head 2 has a base 13 and a plurality of cutting faces 14 embedded in the base 13. The cutting faces 14 form the tip 15 of the drill head 2. The cutting faces 14 protrude with respect to the base 13 in the impact direction 9. The front end 12 of the drill head 2 is made up of the front faces 16, facing in the impact direction 9, of the cutting faces 14 and of the front faces 17 of the base 13. The base 13 has a cylindrical lateral surface 18. Preferably, the cutting faces 14 protrude in the radial direction with respect to the lateral surface 18. The lateral surface 18 can be circumferentially closed beneath the cutting faces 14. An underside 19 of the base 13 is arranged on the hollow shank 4. The underside 19 can be welded or soldered to the shank 4 or joined thereto in a similar materially bonded manner. In other embodiments, the drill head 2 can be connected to the shank 4 by means of a screw connection, a bayonet coupling or preferably a conical interference fit (FIG. 6).

Figure 3:
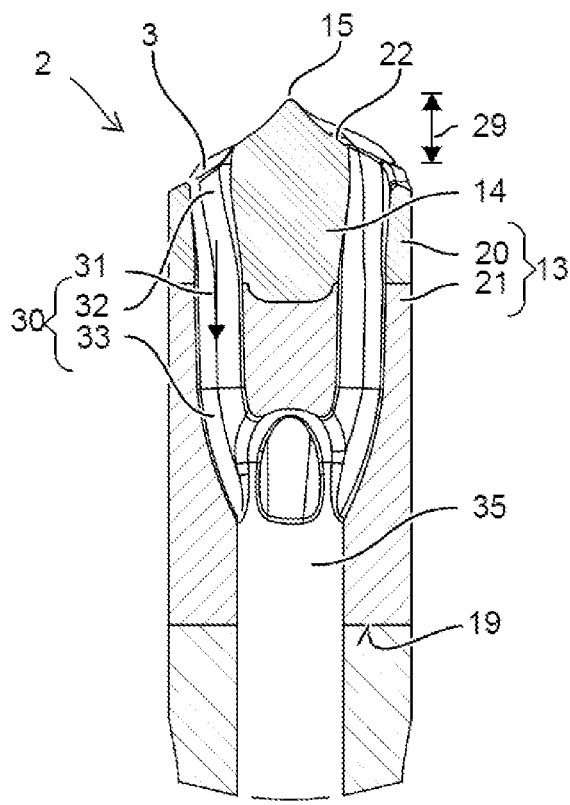
FIG. 3 shows a section through the drill head

The cutting faces 14 are preferably made of a sintered tungsten carbide-containing material. In one configuration, a portion 20 of the base 13 that encircles the cutting faces 14 can be produced from the sintered tungsten carbide-containing material and a portion 21 forming the underside can be produced from the sintered iron-based material (FIG. 3).

The cutting faces 14 are arranged in a star shape around the drill bit axis 11. The cutting faces 14 are monolithically cohesive, in particular joined together by welding, soldering, clamping etc. without a joint zone. The cutting faces 14 are preferably sintered from a tungsten carbide-containing material. The cutting faces 14 are preferably arranged regularly or regularly in pairs around the drill bit axis 11. For example, the four identical cutting faces 14 are arranged at spacings of 90 degrees in the direction of rotation 10. In other embodiments, the cutting faces can be formed so as to be different. For example, the drill head has main cutting faces and secondary cutting faces. The exemplary embodiment shows four cutting faces 14; in other embodiments, the drill head 2 can have three, five or six cutting faces 14.

The cutting faces 14 each have a chisel edge 22 that protrudes in the impact direction 9 and narrows in the radial direction to a tip 15 of the drill head 2. The chisel edge 22 can be straight or curved. The chisel edges 22 are preferably formed identically or identically in pairs. In the configuration illustrated, all chisel edges 22 extend as far as the tip 15;

in other configurations, only chisel edges of the main cutting faces reach as far as the tip 15. The single tip 15 of the drill head 2 is located preferably on the drill bit axis 11.

The front face 16, facing in the impact direction 9, of each cutting face 14 is formed by a rake face 23 and a flank face 24. The rake face 23 and the flank face 24 both face in the impact direction 9 and are in contact with one another along the chisel edge 22. The rake face 23 and the flank face 24 are prolonged in the radial direction. The rake face 23 and the flank face 24 extend from a location adjoining the outer peripheral face 25 as far as the drill bit axis 11 or into the vicinity of the drill bit axis 11. The rake face 23 leads the flank face 24 in the normal direction of rotation 10 of the drill head 2. Looking at the drill head 2, the normal direction of rotation 10 is counterclockwise. The rake face 23 and the flank face 24 are inclined with respect to the drill bit axis 11. The rake face 23 rises counter to the direction of rotation 10 in the impact direction 9; by contrast, the flank face 24 drops counter to the direction of rotation 10 in the impact direction 9. The rake face 23 and the flank face 24 are accordingly inclined with respect to one another. A roof angle 26 between the rake face 23 and the flank face 24 is greater than 45 degrees, for example greater than 60 degrees and less than 120 degrees. The roof angle 26 can be constant or vary in the radial direction.

A peripheral face 25, facing away from the drill bit axis 11, of the cutting faces 14 is oriented preferably parallel to the drill bit axis 11. The peripheral face 25 defines, with its radial spacing from the drill bit axis 11, the diameter 27 of the drill head 2. The peripheral face 25 forms a break-off edge 28, which bears against a drilled-hole wall during drilling. The break-off edges 28 support the formation of a circular cylindrical shape of the drilled hole by breaking off rock that protrudes radially into the drilled hole. The peripheral face 25 protrudes preferably in the radial direction with respect to the lateral surface 18 of the cylindrical base 13. The cutting faces 14 subdivide an upper portion of the lateral surface 18 into a plurality of cylindrical sectors. A lower portion, connected to the upper portion, of the lateral surface 18 is preferably circumferentially closed, i.e. fully cylindrical.

Provided at the front end 12 of the drill head 2 are a plurality of intake openings 3. The intake openings 3 can be arranged centrally between adjacent chisel edges 22. The intake openings 3 are preferably located in the front faces 17 of the base 13. The intake openings 3 are circumferentially closed, and to this end the intake openings 3 are arranged in a manner spaced apart from the lateral surface 18. A radial spacing of the intake openings 3 is for example between 5% and 20% of the diameter of the drill head 2. The intake openings 3 are arranged along the drill bit axis 11 in a manner offset from the chisel edges 22. The intake openings 3 are located lower down than the chisel edges 22 and therefore do not influence the chiselling functionality of the drill head 2, or only influence it to an insignificant extent. An axial offset 29 of the intake openings 3 with respect to the tip 15 is preferably greater than 15% of the diameter 27 of the drill bit 1.

Respective intake passages 30 connect the intake openings 3 in the front end 12 to the underside 19 of the drill head 2. The defined direction of flow 31 is from the intake openings 3 to the underside 19, i.e. counter to the impact direction 9. The intake passage 30 is closed transversely to the direction of flow along its entire length. The intake passage 30 to this end extends fully within the base 13.

The intake passage 30 approaches the drill bit axis 11 in the direction of flow 31. The approach is not in a straight line, but rather the intake passage 30 is at least partially curved. An upper portion 32 of the intake passage 30 adjoining the intake openings 3 is substantially parallel to the cutting faces 14, i.e. to the drill bit axis 11. The intake passage 30 does not approach the cutting faces 14 or only approaches them to a minor extent in the direction of flow 31. An approach of the intake passage 30 to the drill bit axis 11 in the upper portion 32 is preferably less than 5% of the diameter 27 of the drill bit 1. As a measure for determining the radial spacing, use can be made of the centroid in the cross sections perpendicular to the drill bit axis 11. The upper portion 32 extends over at least 50%, for example 75%, of the height of the cutting faces 14, preferably over at least the entire height of the cutting faces 14. The upper portion 32 can be formed in a rectilinear or curved manner. A lower portion 33 of the intake passage 30 adjoining the hollow shank 4 is inclined with respect to the cutting faces 14. The lower portion 33 increasingly approaches the drill bit axis 11 in the direction of the shank 4. The lower portion 33 of the intake passage 30 can run into the hollow shank 4 with an inclination of between 10 degrees and 30 degrees. The intake passage 30 preferably approaches the drill bit axis 11 between 5% and 30% of the diameter 27 of the drill bit 1. The exemplary lower portion 33 is continuously curved. The lower portion can also be configured in a rectilinear manner. A portion connecting the upper portion to the lower portion is suitably curved. All curved portions of the intake passage 30 have preferably a radius of curvature greater than 80% of the diameter 27 of the drill bit 1. The intake passage 30 has smooth inner walls along its entire length. The gentle curves with large radii of curvature favor friction-free transport of the drill cuttings in the intake passages 30. In particular, sticking or jamming of larger drill cutting pieces is avoided.

The intake openings 3 take up an area of 10% to 25% at the front end 12. The high percentage is advantageous for ensuring that the drill cuttings are transported away. The intake passage 30 can have a cross section that widens in the direction of flow 31. The intake passage 30 has its smallest cross section at or close to the intake opening 3. The change in cross section reduces any tendency of the intake passage 30 to become clogged. The surface area of the cross section changes change by at least 30%, preferably by more than 60%. The surface area of the cross section is determined in planes perpendicular to the drill bit axis 11. The change takes place preferably entirely or primarily within the upper portion 32, i.e. at the level of the cutting faces 14. A radially outer wall of the intake passages 30 is preferably parallel to the drill bit axis 11, while a radially inner wall of the intake passages 30 approaches the drill bit axis 11 in order to obtain the cross-sectional widening.

The exemplary intake openings 3 are noncircular. The intake openings 3 have a triangular shape. Corners of the intake openings 3 can be pointed or rounded. The sides connecting the corners can be straight or curved. In a manner typical for a triangle, a circle is able to be inscribed in the intake opening 3, said circle touching each of the three sides at precisely one point. Furthermore, in a manner typical for a triangle, a distance between the center of the inscribed circle and the sides decreases from the corners to the point touched by the circle. A corner of the intake openings 3 points toward the tip 15 of the drill head 2. An internal angle 34 at the corner corresponds preferably more or less to the angular distance between the adjacent cutting faces 14, for example 90 degrees. "More or less", in this context describes a deviation of less than 20%. The surface area of the intake openings 3 is much greater than the surface area of the inscribed circle. The surface area of the intake openings 3 is at least 30% greater, for example at least 100% greater.

The hollow shank 4 has a delivery passage 35 extending along the drill bit axis 11. The delivery passage 35 has a constant cross section along the length of the shank 4. A surface area of the cross section of the delivery passage 35 is preferably equal to the sum of the cross sections of the intake passages 30. The delivery passage 35 has for example a surface area of 15% to 65% of the cross section of the shank 4. The delivery passage 35 can be arranged centrally on the drill bit axis 11. The delivery passage 35 ends beneath the drill head 2, in particular beneath the base 13. The end of the delivery passage 35 is preferably rounded in the form of a spherical cap.

The intake passages 30 in the drill head 2 open into the delivery passage 35 of the hollow shank 4. The mouth is at or close to one end of the delivery passage 35. The faces at the mouth are rounded.

Arranged at an end of the delivery passage 35 remote from the drill head 2 is the extraction port 5. The extraction port 5 contains a radial cut 36 into the delivery passage 35. The sleeve 8 surrounds the cylindrical shank, preferably in an airtight manner, in the region of the cut 36. The sleeve 8 is rotatable relative to the shank 4.

The exemplary insertion end 6 of the drill bit 1 is designed for the use of rotary chiselling portable power tools. The insertion end 6 has a substantially cylindrical shape. The insertion end 6 has two closed slots 37, in which locking elements of the portable power tool can engage radially and can slide along the drill bit axis 11. Flutes 38 oriented along the drill bit axis 11 allow torque to be introduced by the portable power tool.

The drill bit 1 is preferably manufactured from different materials. The shank 4 and the insertion end 6 are preferably made of a tough and ductile steel. The cutting faces 14 of the drill head 2 are made of very hard and abrasion-resistant sintered tungsten carbide. The tungsten carbide is present in a content of at least 70% by volume. The metallic binder contains preferably one or more of the metals: cobalt and nickel. For example, the binder can consist entirely of cobalt.

The drill head 2 can be produced in non-customary manner in a basic form, which is subsequently machined in order to form the intake passages 30. Subsequently, a production process is proposed, with which the desired intake passages 30 can be formed. The described production process can be modified in certain details without departing from the principle thereof.

A thin powder layer is produced by spraying a suspension containing tungsten carbide and the metallic binder. An adhesive is pressed onto the powder layer in a structured manner. The adhesive reproduces a cross section through the drill head 2. The deposition of a powder layer and of the adhesive is repeated as many times as necessary for a blank of the drill head 2 to be replicated. The excess powder, in particular in the intake passages 30, can be removed by water. The water penetrates between the layers not joined by adhesive and dislodges them. The resultant blank now corresponds to the shape of the drill head 2. The green body can be sintered.

The difficulty in the production of the drill head 2 is due to the high mechanical demands placed on the drill head 2, which allow only a very low level of porosity. A necessary density of the drill head 2 has to be greater than 98% of the theoretically achievable value. To this end, the green body has to have a density of at least 50% of the theoretical density before sintering. The sintering is accompanied by typical shrinkage, which sufficiently closes the pores starting from this value. Conventional processes involving compaction of the green body in a mold achieve these values. The loose joining together of the layers, in principle only by gravity, imposes new challenges here.

A promising approach is based on a powder mixture of tungsten carbide and cobalt oxide. The cobalt oxide is converted into cobalt after the formation of the green body. As liquid, the suspension contains water or alcohol, preferably isopropyl alcohol. The ratio of liquid to powder is in the range between 3 and 5 to 1. The suspension can be sprayed uniformly under pressure through a narrow nozzle. After spraying, the layer is dried at just above room temperature. The layers have a uniform thickness in the range between 20 µm and 30 µm. The adhesive is based on an aqueous solution of polyethyleneimine. Polyethyleneimine has a very high affinity for binding to the grains of the tungsten carbide. In this way, good adhesive bonding is achieved. The proportion by weight of polyethyleneimine in the solution can be in the range between 1% and 5%. After pressing, the adhesive is dried at just above room temperature. After the last layer has been applied, the adhesive is cured in a furnace at about 150 degrees Celsius (° C.). Subsequently, the excess powder is removed by water. The cobalt oxide in the green body is converted into cobalt in that the green body is kept in a hydrogen-containing atmosphere at 600° C. to 700° C. for several hours. Finally, the green body can be sintered at a temperature of between 1250° C. and 1400° C.

The iron-containing lower portion 21 of the base 13 can likewise be produced via three-dimensional shaping. For example, it is likewise possible for a green body to be pressed and subsequently sintered. Furthermore, for the production of steel bodies, processes such as laser build-up welding, selective laser melting (SLM) or selective laser sintering (SLS) are also possible.

Figure 2:
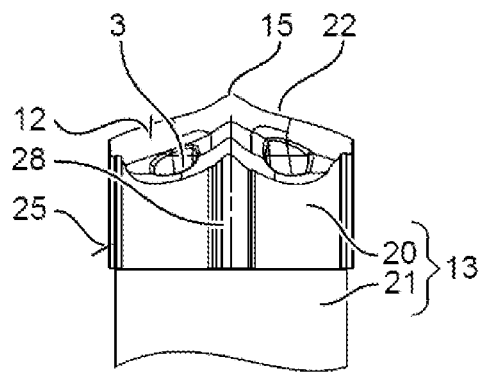
FIG. 2 shows a side view of a drill head of the drill bit
Figure 4:
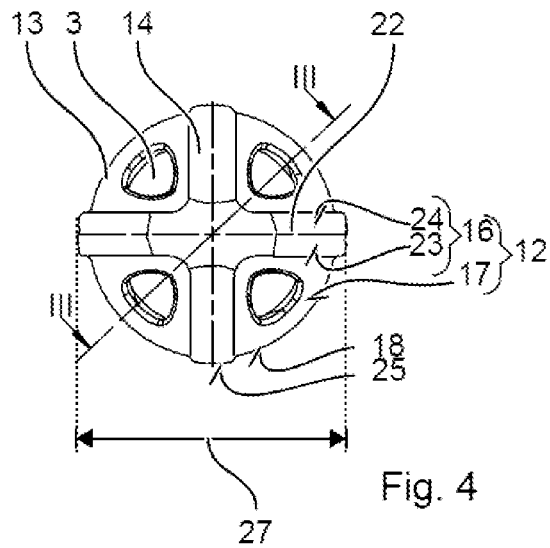
FIG. 4 shows a plan view of the front end of the drill head
Figure 5:
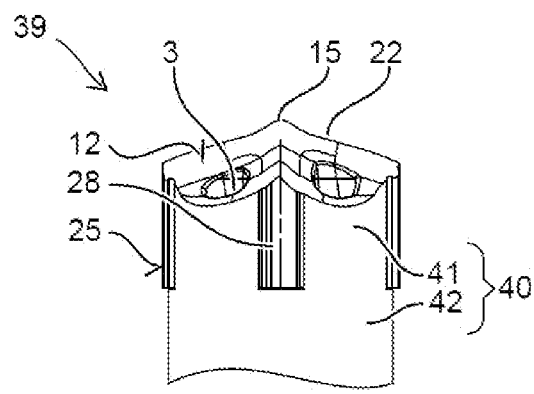
FIG. 5 shows a side view of a drill head of the drill bit
Figure 7:
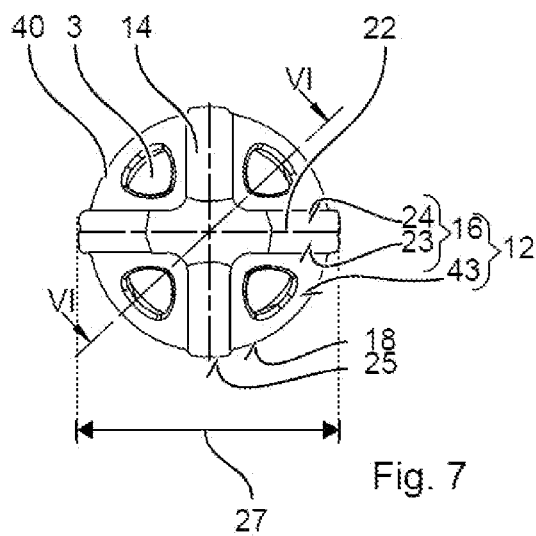
FIG. 7 shows a plan view of the front end of the drill head

Another embodiment of the drill head 39 is shown in FIG. 5, FIG. 6 and FIG. 7. The cutting faces 14 are formed in a cross-shaped manner, as in the embodiment in FIG. 2. The cutting faces 14 are preferably sintered from tungsten carbide. As in the previous embodiment, the base 40 has an upper portion 41 and a lower portion 42. The difference from the previous embodiment is that the base 40 is formed from one material. The upper portion 41 is also formed from an iron-containing material in this case. The upper portion 41 has a cross-shaped slot, into which the cutting faces 14 have been inserted. The front end 12 of the drill head 2 consists as a result of the hard cutting faces 14 and the front face 43 of the relatively softer base 40. The cutting faces 14 can have been soldered or welded to the base 40.

The intake passages 30 extend in a closed manner in the upper portion 41 of the base 13. The intake passages 30 are spaced apart both from the circumference of the drill head 2 and from the cutting faces 14. The course of the passages and the further properties thereof can correspond to the previous embodiment.

Figure 8:
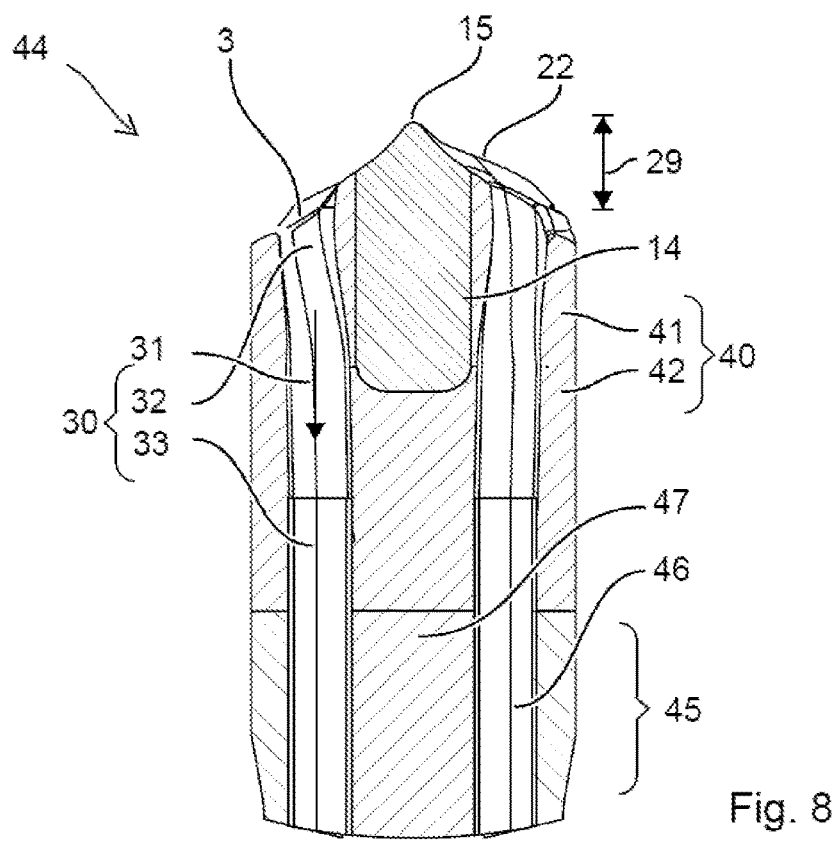
FIG. 8 shows a section through a drill head
Figure 9:
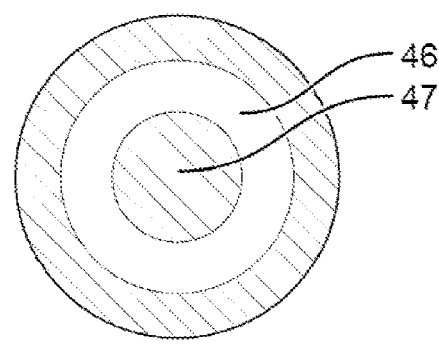
FIG. 9 shows a section through the hollow shank
Figure 10:
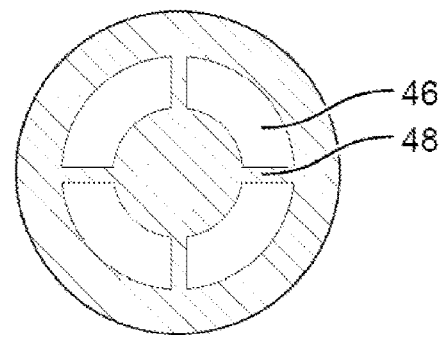
FIG. 10 shows a section through the hollow shank
Identical or functionally identical elements are indicated by the same reference signs in the figures unless specified otherwise.

Another embodiment is shown in FIG. 8. The drill head 44 likewise has a base 40 and four cutting faces 14. The base 40 and the cutting faces 14 can have been formed as in one of the previous embodiments. The intake openings 3 are arranged in the base 40, and the intake passages 30 extend in the base 40 in an analogous manner to the previous embodiments. The hollow shank 45 has a delivery passage 46 and a core 47. The core 47 is a rod-like solid structure that lies on the drill bit axis 11. An impact on the impact face 7 is transmitted to the cutting faces 14 via the core 47. The delivery passage 46 can for example annularly surround the core 47 (FIG. 9). The intake passages 30 open into the delivery passage 46. The core 47 can be supported on the outer shell of the shank 4 via struts 48 (FIG. 10). The struts 48 can subdivide the delivery passage 46 into a plurality of passages, for example each intake passage 30 can be assigned a delivery passage 35 48.

The invention claimed is:

1. A drill bit for chiselling rock, comprising:
an impact face at an insertion end of the drill bit;
a hollow shank, wherein a delivery passage is defined within the hollow shank; and
a drill head, wherein the drill head has, at a front end of the drill head, a plurality of cutting faces, an intake opening, and an intake passage and wherein the intake passage connects the intake opening to the delivery passage;
wherein the intake opening has a noncircular cross section;
wherein a surface area of the intake opening is at least 30% greater than a surface area of a largest circle that is inscribable in the intake opening.

2. The drill bit as claimed in claim 1, wherein the intake opening has a triangular shape.

3. The drill bit as claimed in claim 1, wherein the intake opening takes up more than 10% of the front end of the drill head.

4. The drill bit as claimed in claim 1, wherein the intake opening takes up less than 25% of the front end of the drill head.

5. The drill bit as claimed in claim 1, wherein each of the plurality of cutting faces has a rake face and a flank face which are in contact with one another along a chisel edge.

6. The drill bit as claimed in claim 1, wherein the plurality of cutting faces are sintered tungsten carbide.

* * * * *